(12) United States Patent
Wilkinson et al.

(10) Patent No.: US 10,489,266 B2
(45) Date of Patent: Nov. 26, 2019

(54) GENERATING A VISUALIZATION OF A METRIC AT ONE OR MULTIPLE LEVELS OF EXECUTION OF A DATABASE WORKLOAD

(71) Applicant: Hewlett Packard Enterprise Development LP, Houston, TX (US)

(72) Inventors: William K. Wilkinson, San Mateo, CA (US); Alkiviadis Simitsis, Palo Alto, CA (US); Craig Peter Sayers, Menlo Park, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 25 days.

(21) Appl. No.: 15/034,324

(22) PCT Filed: Dec. 20, 2013

(86) PCT No.: PCT/US2013/076796
§ 371 (c)(1),
(2) Date: May 4, 2016

(87) PCT Pub. No.: WO2015/094319
PCT Pub. Date: Jun. 25, 2015

(65) Prior Publication Data
US 2016/0299827 A1    Oct. 13, 2016

(51) Int. Cl.
| G06F 11/34 | (2006.01) |
| G06F 11/30 | (2006.01) |
| G06F 9/50 | (2006.01) |
| G06F 17/30 | (2006.01) |
| G06F 16/248 | (2019.01) |
| G06F 11/32 | (2006.01) |

(52) U.S. Cl.
CPC ........ *G06F 11/3433* (2013.01); *G06F 11/323* (2013.01); *G06F 16/248* (2019.01); *G06F 11/3409* (2013.01); *G06F 11/3419* (2013.01)

(58) Field of Classification Search
None
See application file for complete search history.

(56) References Cited

U.S. PATENT DOCUMENTS

| 5,963,936 | A | * | 10/1999 | Cochrane | .......... G06F 17/30454 |
| 5,982,186 | A | | 11/1999 | Buschbom | |
| 6,470,352 | B2 | * | 10/2002 | Yaginuma | ............. G06F 16/283 |
| 6,593,862 | B1 | | 7/2003 | Wong et al. | |
| 7,409,321 | B2 | | 8/2008 | Repucci et al. | |
| 7,424,530 | B2 | * | 9/2008 | Chagoly | ............. G06F 11/3466 |
| | | | | | 705/7.38 |
| 7,617,185 | B2 | * | 11/2009 | Werner | ............... G06F 16/9038 |

(Continued)

OTHER PUBLICATIONS

"Database Query Monitor", Zoho Corporation, Oct. 23, 2008.
(Continued)

*Primary Examiner* — Abu Zar Ghaffari (57) ABSTRACT

Described herein are techniques for generating a visualization relating to execution of a workload. Multiple measurements of a plurality of metrics relating to execution of the workload may be aggregated at multiple levels of execution. A visualization may be generated that comprises a representation of the measurements of a metric at one of the levels of execution.

14 Claims, 7 Drawing Sheets

(56) References Cited

U.S. PATENT DOCUMENTS

| | | | |
|---|---|---|---|
| 7,660,823 B2* | 2/2010 | Clover | G06Q 40/04 707/805 |
| 7,783,510 B1 | 8/2010 | Gilgur et al. | |
| 7,805,510 B2* | 9/2010 | Bansal | H04L 67/22 709/224 |
| 7,817,563 B1 | 10/2010 | Buragohain et al. | |
| 7,996,378 B2* | 8/2011 | Wang | G06F 16/26 707/705 |
| 8,122,050 B2* | 2/2012 | Mordvinov | G06F 17/30424 707/769 |
| 8,321,805 B2 | 11/2012 | Tien et al. | |
| 8,452,756 B2 | 5/2013 | Anderson et al. | |
| 8,533,218 B2 | 9/2013 | Debrot et al. | |
| 8,554,699 B2 | 10/2013 | Ruhl et al. | |
| 8,577,871 B2 | 11/2013 | Dageville et al. | |
| 8,949,224 B2* | 2/2015 | Gupta | G06F 17/30592 707/718 |
| 9,128,994 B2* | 9/2015 | Smolinski | G06F 17/30696 |
| 9,251,464 B1 | 2/2016 | Kellas-Dicks et al. | |
| 9,501,537 B2* | 11/2016 | Walter | H04W 52/027 |
| 9,594,791 B2 | 3/2017 | Bell et al. | |
| 9,632,858 B2 | 4/2017 | Sasturkar et al. | |
| 2004/0111398 A1* | 6/2004 | England | G06F 17/3056 |
| 2004/0210563 A1 | 10/2004 | Zait et al. | |
| 2005/0102613 A1* | 5/2005 | Boukouvalas | G06F 17/2247 715/237 |
| 2006/0064426 A1 | 3/2006 | Barsness et al. | |
| 2006/0085166 A1* | 4/2006 | Ochi | G06F 11/3409 702/186 |
| 2006/0248401 A1* | 11/2006 | Carroll | G06F 11/3423 714/38.1 |
| 2006/0253471 A1 | 11/2006 | Wasserman | |
| 2007/0010998 A1 | 1/2007 | Radhakrishnan et al. | |
| 2008/0183865 A1* | 7/2008 | Appleby | H04L 67/1008 709/224 |
| 2009/0106189 A1* | 4/2009 | Jain | G06F 17/30516 |
| 2009/0313634 A1 | 12/2009 | Nguyen et al. | |
| 2009/0327242 A1* | 12/2009 | Brown | G06F 17/30463 |
| 2009/0327254 A1* | 12/2009 | Bruno | G06F 17/30312 |
| 2009/0327852 A1* | 12/2009 | MacGregor | G06F 17/245 715/214 |
| 2010/0082125 A1* | 4/2010 | Pingel | G05B 23/0272 700/47 |
| 2010/0082517 A1 | 4/2010 | Schapker et al. | |
| 2010/0082599 A1 | 4/2010 | Graefe et al. | |
| 2010/0198807 A1 | 8/2010 | Kuno et al. | |
| 2010/0235349 A1* | 9/2010 | Kuno | G06F 17/30306 707/718 |
| 2010/0292980 A1* | 11/2010 | Andrade | G06F 9/5011 703/22 |
| 2010/0312762 A1 | 12/2010 | Yan et al. | |
| 2011/0055214 A1* | 3/2011 | Mui | G06F 17/30554 707/737 |
| 2011/0072411 A1* | 3/2011 | Cornell | G06F 8/10 717/105 |
| 2011/0082927 A1* | 4/2011 | Chambers | G06Q 10/06 709/224 |
| 2011/0119374 A1 | 5/2011 | Ruhl et al. | |
| 2011/0153603 A1 | 6/2011 | Adiba et al. | |
| 2011/0283260 A1 | 11/2011 | Bucuvalas | |
| 2011/0314403 A1 | 12/2011 | Yan | |
| 2012/0022707 A1* | 1/2012 | Budhraja | H02J 3/008 700/292 |
| 2012/0072575 A1* | 3/2012 | King | G06F 11/3476 709/224 |
| 2012/0179713 A1* | 7/2012 | Stolte | G06F 17/30592 707/769 |
| 2012/0180108 A1* | 7/2012 | Siklos | G06Q 10/06395 726/3 |
| 2012/0278321 A1* | 11/2012 | Traub | G06F 17/30657 707/736 |
| 2013/0124714 A1* | 5/2013 | Bednar | G06F 9/45558 709/224 |
| 2013/0151505 A1* | 6/2013 | Yoon | G06F 17/30442 707/718 |
| 2013/0185729 A1 | 7/2013 | Vasic et al. | |
| 2013/0191411 A1 | 7/2013 | Carlson et al. | |
| 2013/0212142 A1 | 8/2013 | Martinez Heras | |
| 2013/0262443 A1 | 10/2013 | Leida et al. | |
| 2013/0268520 A1* | 10/2013 | Fisher | G06F 16/248 707/723 |
| 2013/0343213 A1 | 12/2013 | Reynolds et al. | |
| 2013/0346427 A1* | 12/2013 | Impink | G06F 11/3495 707/755 |
| 2014/0095541 A1 | 4/2014 | Herwadkar et al. | |
| 2014/0149947 A1* | 5/2014 | Blyumen | G06F 17/30 715/863 |
| 2014/0278838 A1 | 9/2014 | Novak | |
| 2014/0279824 A1* | 9/2014 | Tamayo | G06F 17/30572 707/600 |
| 2015/0033084 A1 | 1/2015 | Sasturkar et al. | |
| 2015/0033086 A1 | 1/2015 | Sasturkar et al. | |
| 2015/0039555 A1 | 2/2015 | Rao | |
| 2016/0246842 A1 | 8/2016 | Li et al. | |

OTHER PUBLICATIONS

"Troubleshooting Best Practices for Developing Windows Azure Applications", Jan. 2012.

Chuang, K-T et al, "Feature-Preserved Sampling Over Streaming Data", Jan. 2009.

Fajardo, W et al, "Pattern Characterization in Multivariate Data Series Using Fuzzy Logic", Jul. 30, 2012.

Grust, T et al, "Observing SQL Queries in Their Natural Habitat", Oct. 11, 2012.

Mayer, W et al, "Model-based Debugging with High-level Observations", Jul. 12, 2004.

Mishra, C et al, "A Lightweight Online Framework for Query Progress Indicators", Feb. 10, 2007.

Shah, N et al, "Dynamically Measuring Statistical Dependencies in Multivariate Financial Time Series Using Independent Component Analysis", Mar. 30, 2013.

Georgia Koutrika, et al., "Mirror mirror on the wail, which query's fairest of them all?", 6th Biennial CIDR '13, Jan. 6-9, 2013, 4 pages.

* cited by examiner

GENERATING A VISUALIZATION OF A METRIC AT ONE OR MULTIPLE LEVELS OF EXECUTION OF A DATABASE WORKLOAD

REFERENCE TO RELATED APPLICATIONS

This application is related to International Patent Application No. PCT/US2013/076779, filed on Dec. 20, 2013 and entitled "Identifying a path in a workload that may be associated with a deviation", and International Patent Application No. PCT/US2013/076784, filed on Dec. 20, 2013 and entitled "Discarding data points in a time series", both of which are hereby incorporated by reference.

BACKGROUND

Enterprises (e.g. business concerns, educational organizations, government agencies) can depend on reports and analyses of data. To generate the reports and analyses, workloads, such as queries, can be executed in an execution environment. For example, a query engine (e.g., HP Vertica) can execute a query over a database. Database query monitoring tools collect measurements of performance metrics (e.g., memory and CPU usage) while a query is executing. These metric measurements are often made available through log files or system tables. The metric measurements can be used to understand and diagnose query performance issues. Other metrics, such as network activity, can be collected as well.

BRIEF DESCRIPTION OF DRAWINGS

The following detailed description refers to the drawings, wherein.

DETAILED DESCRIPTION

Workloads, such as queries, may be executed in an execution environment. For example, a query engine (e.g., HP Vertica) can execute a query over a database. Most database systems include monitoring tools that collect performance metrics for individual queries. These metrics are often low-level metrics that may be incomprehensible to a typical user. Moreover, a long-running query may result in tens or hundreds of thousands of metric measurements. These measurements may be even more numerous and complex if the query engine is a parallel database engine, such as HP Vertica. It is unreasonable to expect a user to comprehend thousands of low-level metrics and be able to understand how they relate to the user's query. Simply providing a high-level overview of the performance of the query is also inadequate as much of the information in the metrics may be lost in the abstraction to the higher level. Additionally, monitoring tools often do not collect all of the metrics that could impact query performance, such as network activity.

According to an example implementing the techniques described herein, a visualization may be generated that represents execution of a workload, such as a query. Multiple measurements of a plurality of metrics relating to execution of the workload over a database may be received. The measurements may be received from database monitoring tools or from other sources. The multiple measurements may be aggregated at multiple levels of execution of the workload. Where the workload is a query, example levels of execution include a query level, a query phase level, a path level, a node level, a path level, and an operator level.

A visualization representing execution of the workload may be generated and displayed to a user via a user interface. The visualization may comprise a representation of the measurements of at least one of the metrics at one of the levels. Furthermore, the user may select different metrics or levels via the user interface, and a new visualization comprising a representation of the measurements of the selected metric(s) at the selected level(s) may be generated and displayed. As a result, metric measurements relating to execution of a query may be displayed in an intuitive and easily understandable fashion for a user. Additionally, the user may drill-up or drill-down through multiple levels of execution to investigate performance of the query. Additional examples, advantages, features, modifications and the like are described below with reference to the drawings.

Figure 1:
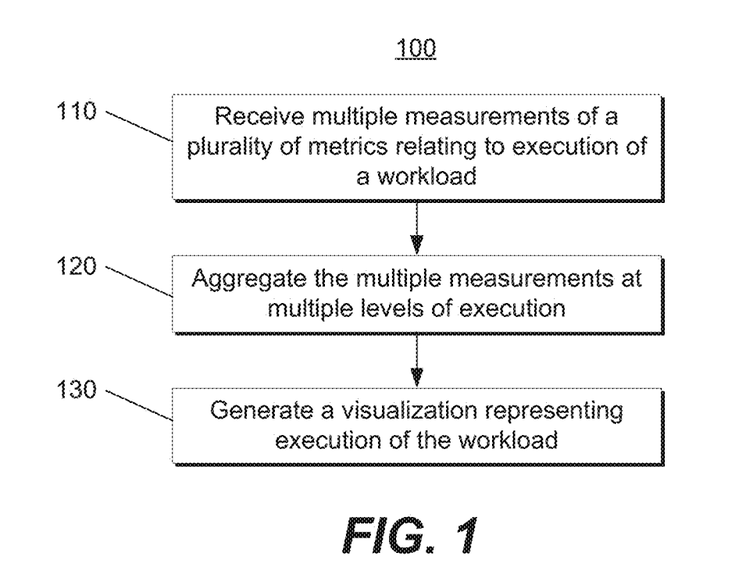
FIG. 1 illustrates a method of generating a visualization of a metric at a level of execution, according to an example.

FIG. 1 illustrates a method for generating a visualization of a metric at a level of execution, according to an example. Method 100 may be performed by a computing device, system, or computer, such as system 310 or computing system 800. Computer-readable instructions for implementing method 100 may be stored on a computer readable storage medium. These instructions as stored on the medium are referred to herein as "modules" and may be executed by a computer.

Figure 2:
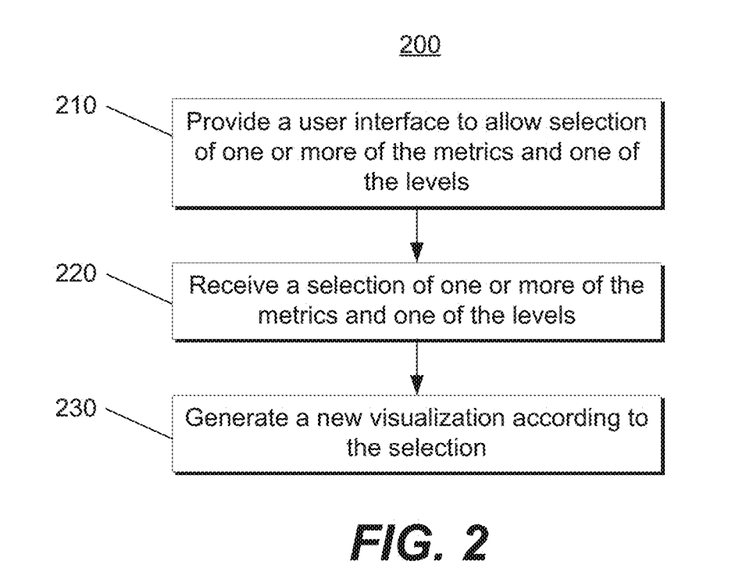
FIG. 2 illustrates a method of generating a visualization of a selected metric at a selected level of execution, according to an example.
Figure 3:
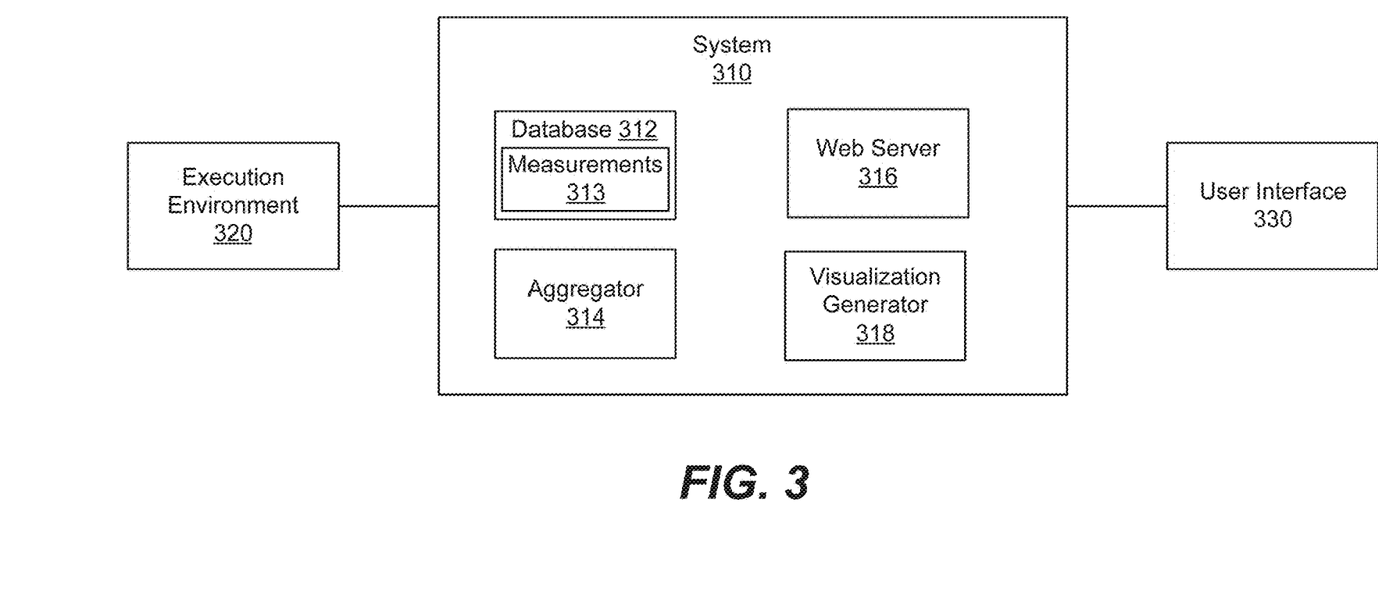
FIG. 3 illustrates a system for generating a visualization of a metric at a level of execution, according to an example.

Methods 100 and 200 will be described here relative to system 310 of FIG. 3. System 310 may include and/or be implemented by one or more computers. For example, the computers may be server computers, workstation computers, desktop computers, laptops, mobile devices, or the like, and may be part of a distributed system. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 310 may include one or more machine-readable storage media separate from the one or more controllers.

System 310 may include a number of components. For example, system 310 may include a database 312 for storing measurements 313, an aggregator 314, a web server 316, and a visualization generator 318. System 310 may be connected to execution environment 320 and user interface 330 via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing. The components of system 310 may also be connected to each other via a network.

Method 100 may begin at 110, where multiple measurements 312 of a plurality of metrics may be received. The multiple measurements may relate to execution of a workload in an execution environment 320. The multiple measurements may be stored in database 312.

Execution environment 320 can include an execution engine and a storage repository of data. An execution engine can include one or multiple execution stages for applying respective operators on data, where the operators can transform or perform some other action with respect to data. A storage repository refers to one or multiple collections of data. An execution environment can be available in a public cloud or public network, in which case the execution environment can be referred to as a public cloud execution environment. Alternatively, an execution environment that is available in a private network can be referred to as a private execution environment.

As an example, execution environment 320 may be a database management system (DBMS). A DBMS stores data in relational tables in a database and applies database operators (e.g. join operators, update operators, merge operators, and so forth) on data in the relational tables. An example DBMS environment is the HP Vertica product.

A workload may include one or more operations to be performed in the execution environment. For example, the workload may be a query, such as a Structured Language (SQL) query. The workload may be some other type of workflow, such as a Map-Reduce workflow to be executed in a Map-Reduce execution environment or an Extract-Transform-Load (ETL) workflow to be executed in an ETL execution environment.

The multiple measurements 313 of the plurality of metrics relate to execution of the workload. For example, the metrics may include performance metrics like elapsed time, execution time, memory allocated, memory reserved, rows processed, and processor utilization. The metrics may also include other information that could affect workload performance, such as network activity or performance within execution environment 320. For instance, poor network performance could adversely performance of a query whose execution is spread out over multiple nodes in execution environment 320. Additionally, estimates of the metrics for the workload may also be available. The estimates may indicate an expected performance of the workload in execution environment 320. Having the estimates may be useful for evaluating the actual performance of the workload.

The metrics (and estimates) may be retrieved from the execution environment 320 and received at system 310. The metrics may be measured and recorded at set time intervals by monitoring tools in the execution environment. The measurements may then be retrieved periodically, such as after an elapsed time period (e.g., every 4 seconds). Alternatively, the measurements could be retrieved all at once after the query has been fully executed. The metrics may be retrieved from log files or system tables in the execution environment.

At 120, the multiple measurements may be aggregated by aggregator 314 at multiple levels of execution. A level of execution as used herein is intended to denote an execution perspective through which to view the metric measurements. Where the workload is a query, example levels of execution include a query level, a query phase level, a path level, a node level, a path level, and an operator level. These will be illustrated through an example where HP Vertica is the execution environment 320.

Monitoring tools in the HP Vertica engine collect metrics for each instance of each physical operator in the physical execution tree of a submitted query. The measurements of these metrics at the physical operator level correspond to the "operator level". Second, from a user perspective, the query execution plan is the tree of logical operators (referred to as paths in HP Vertica) shown by the SQL explain plan command. Each logical operator (e.g., GroupBy) comprises a number of physical operators in the physical execution tree (e.g., ExpressionEval, HashGroupBy). Accordingly, the metric measurements may be aggregated at the logical operator level, which corresponds to the "path level". Third, a physical operator may run as multiple threads on a node (e.g., a parallel tablescan). Additionally, because HP Vertica is a parallel database, a physical operator may execute on multiple nodes. Thus, the metric measurements may be aggregated at the node level, which corresponds to the "node level".

Fourth, a phase is a sub-tree of a query plan where all operators in the sub-tree may run concurrently. In general, a phase ends at a blocking operator, which is an operator that does not produce any output until it has read all of its input (or, all of one input if the operator has multiple inputs, like a join). Examples of blocking operators are Sort and Count. Accordingly, the metric measurements may be aggregated at the phase level, which corresponds to the "query phase level". Fifth, the metric measurements may be reported for the query as a whole. Thus, the metric measurements may be aggregated at a top level, which corresponds to the "query level".

Consequently, metric measurements as interpreted by aggregator 314 form a multi-dimensional, hierarchical dataset where the dimensions are the various levels of execution.

The metrics may then be aggregated (rolled-up) at the operator level, the path level, the node level, the query phase level, and the query level.

At 130, a visualization representing execution of the workload may be generated. The visualization may comprise a representation of the measurements of at least one of the metrics at one of the levels. The representation may be in various forms, such as in the form of graphs, charts, and/or text. The visualization may additionally comprise a representation of estimates of the measurements of the at least one metric at the one level. The visualization may be generated by visualization generator 318, which interfaces with aggregator 314 to obtain the metric measurements aggregated at the appropriate level.

Returning to the example where the workload is a query, the visualization can vary according to level of execution as follows. A visualization generated at the query level may include a representation of execution of the entire query. A visualization generated at the query phase level may include a representation of execution of the query at a current phase of the query. A visualization generated at the node level may include a representation of execution of the query on one or more nodes of a query engine executing the query. A visualization generated at the path level may include a representation of execution of logical operations of the query. A visualization generated at the operator level may include a representation of execution of physical operations of the query. To reduce the level of detail in the metric measurements, the initial visualization may show the measurements for a default metric (e.g., execution time) aggregated at the node level or path level.

Figure 5:
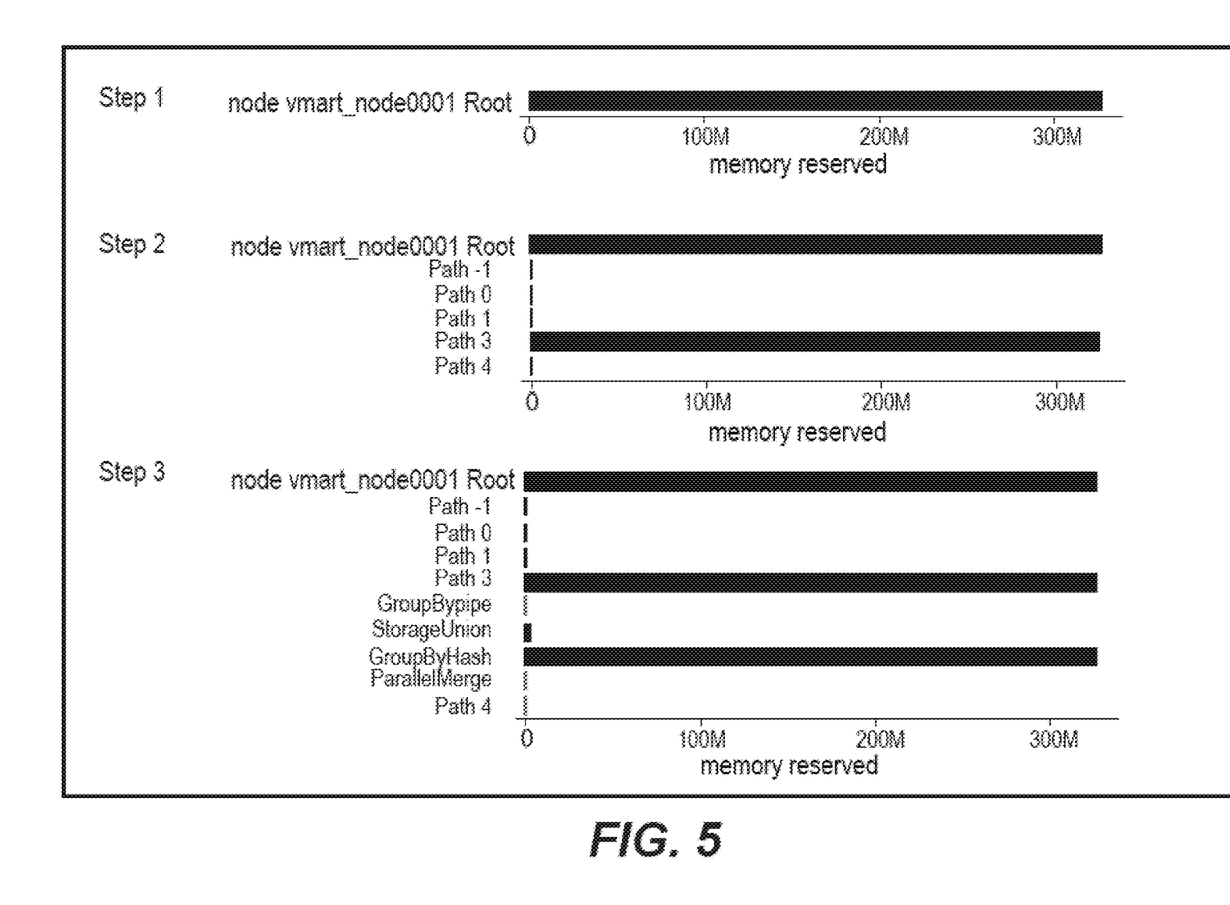
FIG. 5 illustrates drilling down through multiple levels of execution, according to an example.

Method 200 of FIG. 2 begins at 210, where a user interface is provided. The user interface 330 may be provided by web server 316 of system 310, and may be accessed by a user using a web browser or other application. The user interface 330 may be used to submit the workload to the execution environment 320. Alternatively, a workload executing in execution environment 320 may be accessed by entering identifying information, such as transaction and statement identifiers. The user interface 330 may allow selection of one or more of the metrics for display in the visualization. For example, the metrics may be selected in any of various ways, such as by clicking on a tab in the user interface 330, each tab representing a different metric. Alternatively, other selection options may be a dropdown menu, radio buttons, textual input, voice input, touch input, and the like. In addition, the user interface 330 may allow selection of one or more levels. The one or more levels may be selected in any of various ways as well, such as via a dropdown menu or by drilling down on a current displayed level via clicking on the displayed level. For instance, clicking on a path may drill down to the operator level for that path, as illustrated in FIG. 5.

At 220, a selection of one or more of the metrics and one of the levels may be received. At 230, a new visualization may be generated. The new visualization may include a representation of the measurements of the selected one or more metrics at the selected level. The user interface 330 may also allow selection of a time period. For example, the user can view the entire execution history of a completed query, a snapshot of an executing query, or metric information over a range. The visualization may thus be configured to only include measurements of the selected metric(s) at the selected level over the selected time period. This allows a user to focus on execution of the workload during a particular period of time, which can be useful for example if unexpected performance is exhibited only during a particular time. Additionally, system 310 may provide user interface 330 with the explain plan (generated by the execution engine) and any events that occurred during execution (e.g., has table overflow to disk). In some examples, some or all of this information can be incorporated into the visualization for display to the user.

Figure 4:
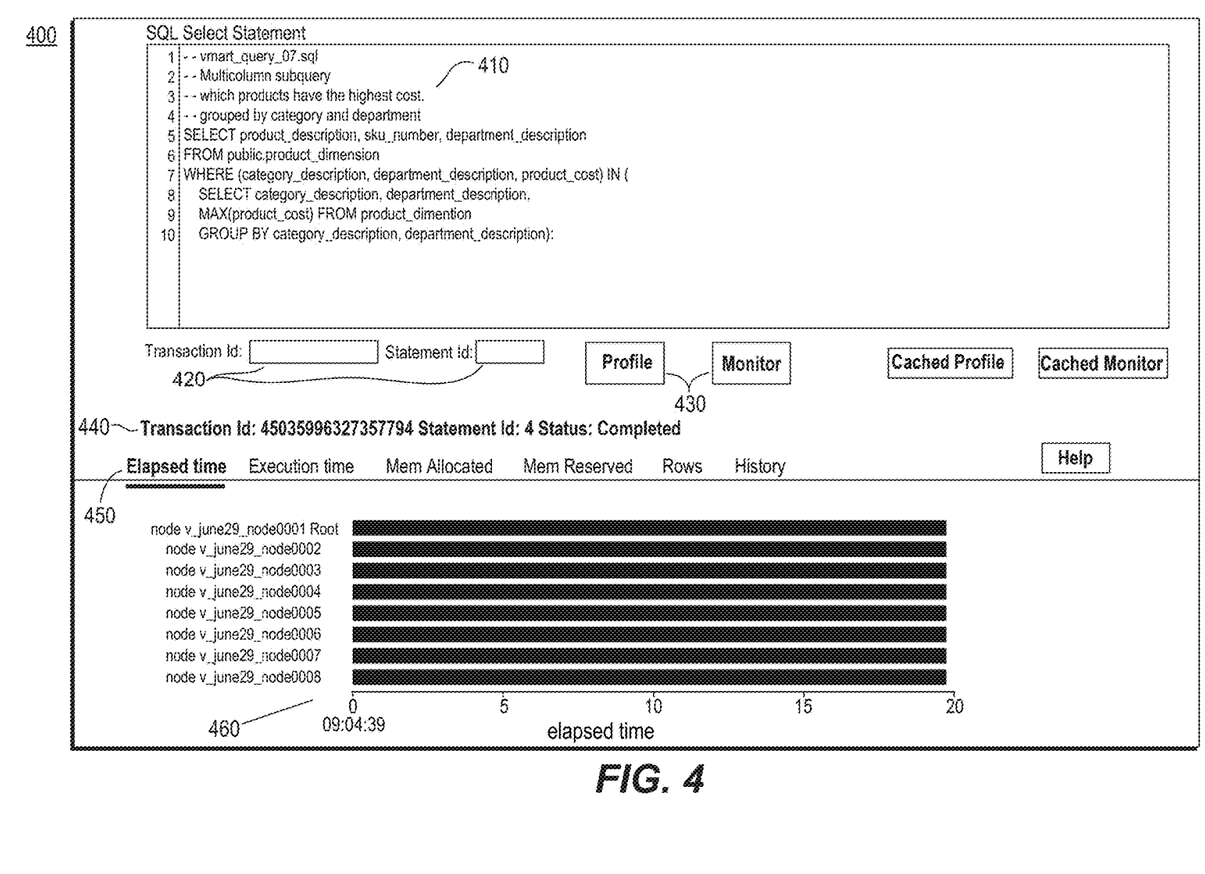
FIG. 4 illustrates a user interface for displaying a visualization, according to an example.

FIG. 4 illustrates a user interface 400 for displaying a visualization for a query executed in an execution environment, according to an example. Portion 410 is a text input box that allows a user to input an SQL query for submission to an execution environment (e.g., HP Vertica). Portion 420 include two text input boxes for identifying a query already executing in the execution environment. The query can be identified using a transaction identifier or a statement identifier. The user interface 400 could be configured to accommodate other methods of identification as well, depending on the execution environment. Buttons 430 allow for specification of a time frame for monitoring the query. The "Profile" button will cause the system to wait for complete execution of the query and then retrieve and display a complete view of the query execution. The "Monitor" button will cause the system to monitor execution of the query and periodically update the visualization to include current metric measurements.

Portion 440 provides identification information for a query whose metrics are being currently displayed in portion 460. Portion 450 comprises various tabs, each tab corresponding to a metric. The metrics are elapsed time, execution time, memory allocated, memory reserved, rows processed, and history. The history metric represents a view of execution of the entire query up to the current time over one or more metrics. Portion 460 constitutes the representation of the selected metric (elapsed time) at the selected level of execution (node level). The representation in this example visualization is a bar graph, the bar graph representing elapsed time for each node. There are many other possible representations for illustrating the metric measurements and estimates. For example, line charts, pie charts, a tree of operators, etc., could be used. Additionally, metric measurements could be illustrated by varying the size, color, position, or shading of a displayed item. Combinations of these representations could be used as well.

FIG. 5 illustrates drilling down through multiple levels of execution, according to an example. This is intended merely to illustrate the drill down process. Thus, the visualization for step 2 represents a modification of the visualization for step 1, and the visualization for step 3 represents a modification of the visualization for step 2. The metric shown in each step is memory reserved. At step 1, measurements of the memory reserved metric are depicted via a bar graph for node 0001 (i.e., at the node level). At step 2, the user drills down on node 0001 to show how the memory has been used at different parts of the query. In particular, the user has drilled down to the path level. As is evident in the visualization, most of the memory has been reserved for path 3. The user has thus learned some potentially useful information. At step 3, the user drills down on path 3 to show how the memory reserved for the path is distributed among the physical operators associated with the path (i.e., the operator level). Again, here the user learns that a single physical operator—GroupByHash—dominates the memory reservation, while the other physical operators are using only a small portion of the memory reserved for the query.

The drill-down operation can be achieved in various ways. For example, the user interface 330 can be configured so that the user may click on a bar in the bar graph for which he desires to drill down. For example, the user could click on the bar for node 0001 in step 1, and in response the visualization could be updated to display the path information (step 2). Clicking on the node 0001 identifier could also cause the drill-down operation to occur. Other methods of indicating a drill-down operation could be used as well, such as via a button, via other interactive elements, via speech, via touch, or the like.

In addition, while exploring the data, the user can pivot to view along different dimensions. For example, the user may start by looking at the performance per node (aggregating with node at the top level), drill down to see a path on that node, and then pivot to view that path on all nodes (aggregating with path at the top level).

Figure 6:
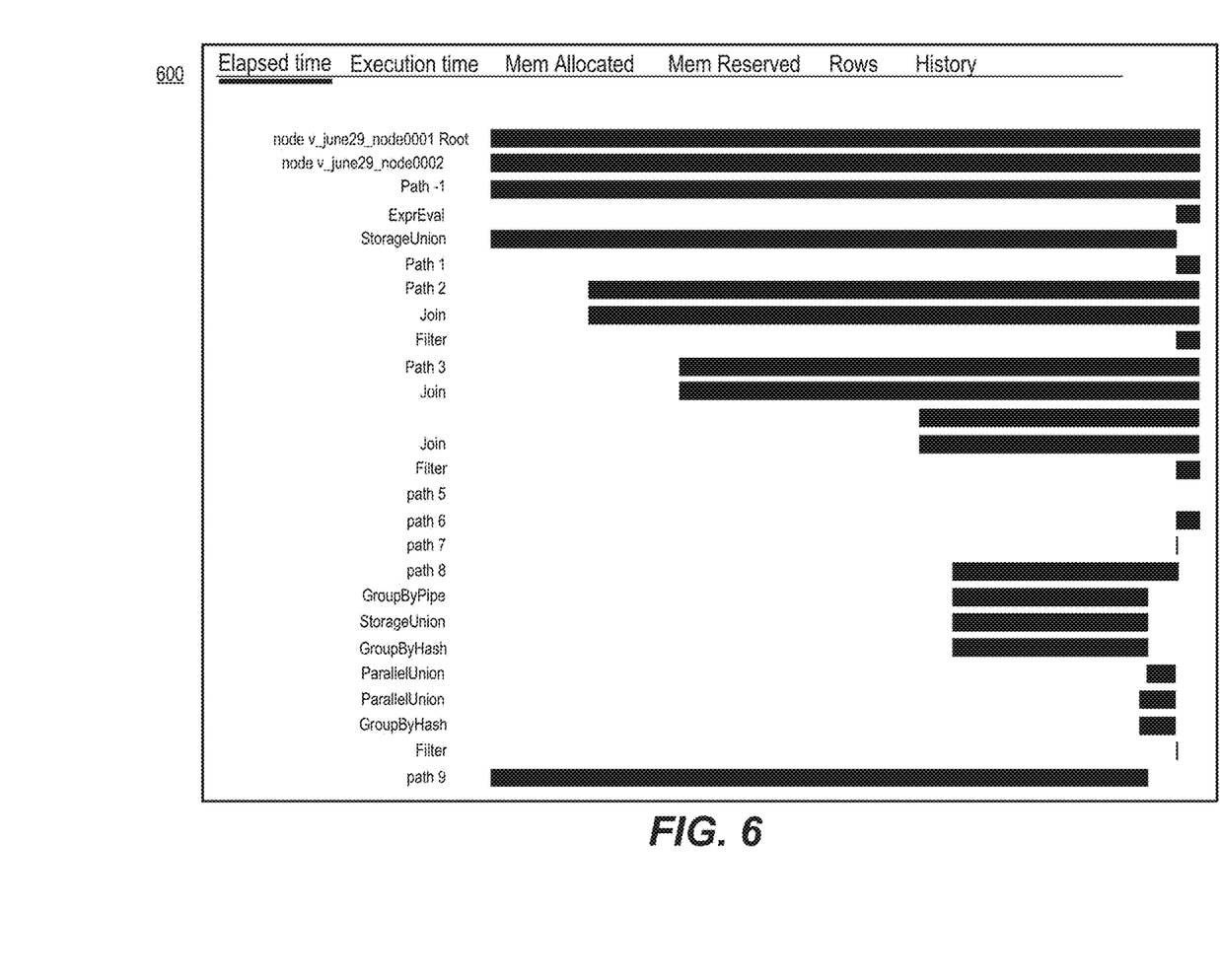
FIG. 6 illustrates a visualization showing metric measurements at multiple levels of execution, according to an example.

FIG. 6 illustrates a visualization showing metric measurements at multiple levels of execution, according to an example. Visualization 600 shows a partial representation of the elapsed time metric in a multi-node system. In particular, node 0002 has been drilled down to the operator level. Although not shown in the figure, the bar graph is plotted as a timeline, where the time scale is displayed at the bottom of the visualization. The user may now see the times at which each path and operator started and stopped. In addition to allowing the user to drilldown and roll up metric information, the visualization can be generated so as to suppress unhelpful information. For example, non-executing portions of a query may be hidden (such as in a snapshot visualization), insignificant metric values can be hidden, and logarithmic scales can be used for certain charts.

Figure 7:
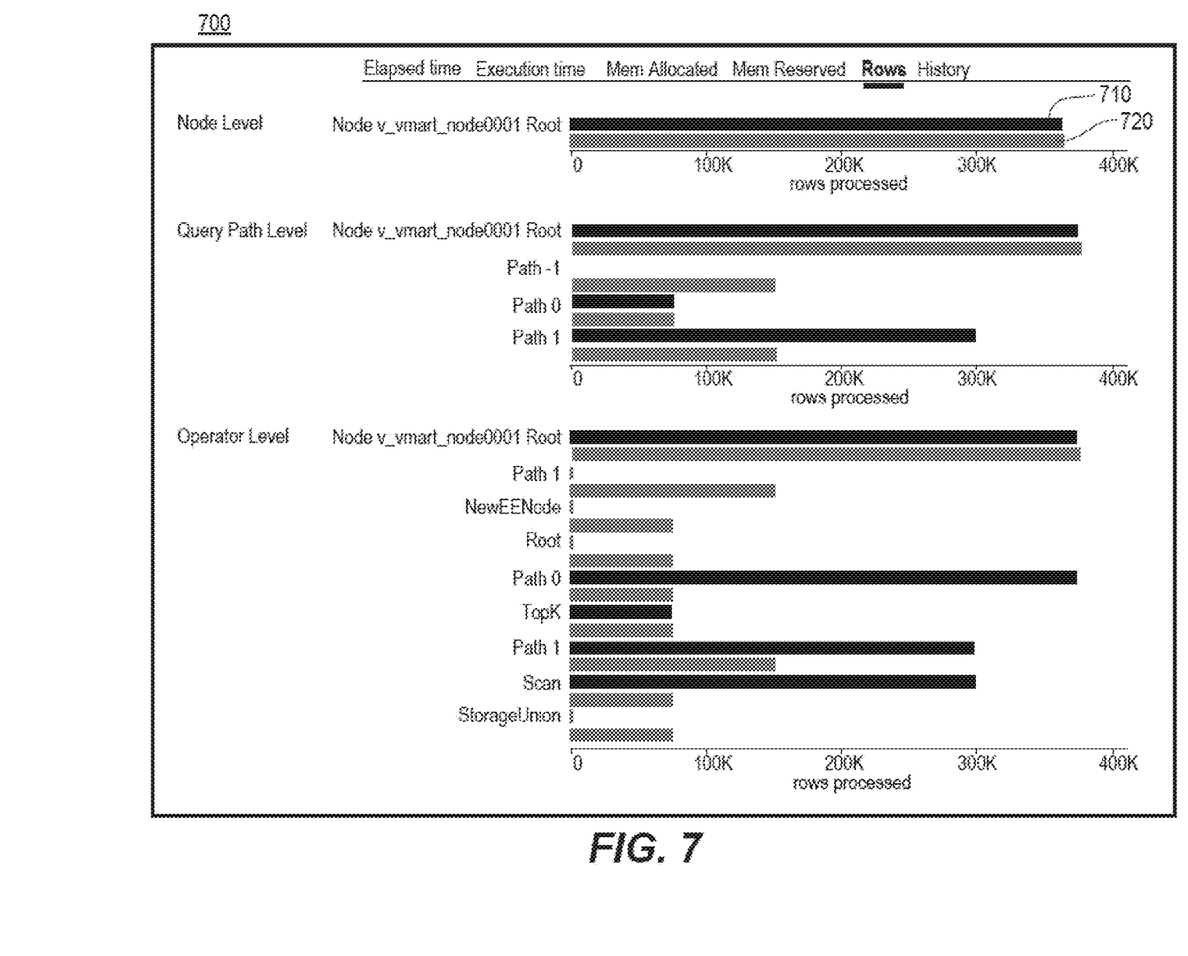
FIG. 7 illustrates a visualization comparing measurements and estimates of a metric at different levels of execution, according to an example.

FIG. 7 illustrates a visualization 700 comparing multiple metrics at different levels of execution, according to an example. In particular, estimated rows processed 710 are compared with actual rows processed 720. By comparing the estimated metric to the actual measurements, a user can determine whether some aspect of the query performed in an unexpected manner. Again, the benefit of drilling down through the different levels is evidenced here. At the node level, the estimate and the actual measurement were similar, and thus one might assume that the query was executed according to expectations. However, drilling down to the path level and then to the operator level reveals that estimates were off for path-1 and path 1, and the corresponding physical operators.

Figure 8:
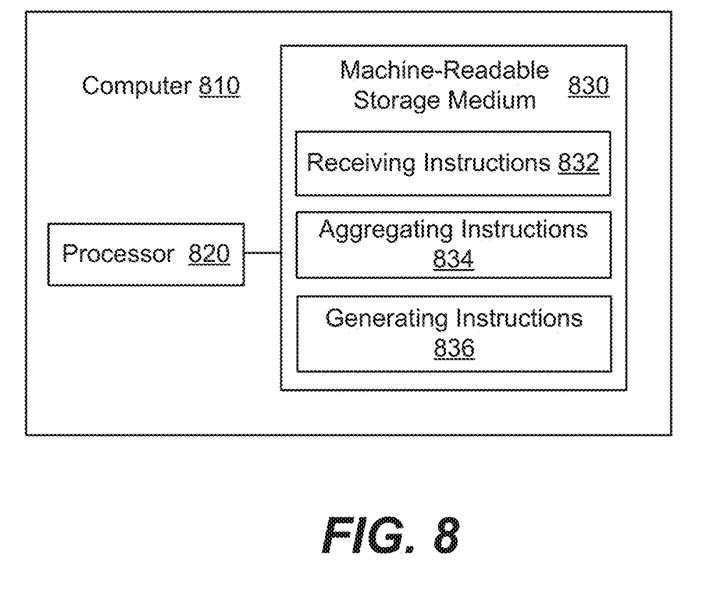
FIG. 8 illustrates a computer-readable medium for generating a visualization of a metric at a level of execution, according to an example.

FIG. 8 illustrates a computer-readable medium for generating a visualization of a metric at a level of execution, according to an example. Computer 810 may include and/or be implemented by one or more computers. For example, the computers may be server computers, workstation computers, desktop computers, laptops, mobile devices, or the like, and may be part of a distributed system. The computers may include one or more controllers and one or more machine-readable storage media, as described with respect to system 310, for example.

In addition, users of computer 810 may interact with computer 810 through one or more other computers, which may or may not be considered part of computer 810. As an example, a user may interact with computer 810 via a computer application residing on system 800 or on another computer, such as a desktop computer, workstation computer, tablet computer, or the like. The computer application can include a user interface (e.g., touch interface, mouse, keyboard, gesture input device).

Computer 810 may perform methods 100 and 200, and variations thereof. Additionally, the functionality implemented by computer 810 may be part of a larger software platform, system, application, or the like. For example, computer 810 may be part of a data analysis system.

Computer(s) 510 may have access to a database. The database may include one or more computers, and may include one or more controllers and machine-readable storage mediums, as described herein. Computer 510 may be connected to the database via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

Processor 820 may be at least one central processing unit (CPU), at least one semiconductor-based microprocessor, other hardware devices or processing elements suitable to retrieve and execute instructions stored in machine-readable storage medium 830, or combinations thereof. Processor 820 can include single or multiple cores on a chip, multiple cores across multiple chips, multiple cores across multiple devices, or combinations thereof. Processor 820 may fetch, decode, and execute instructions 832-836 among others, to implement various processing. As an alternative or in addition to retrieving and executing instructions, processor 820 may include at least one integrated circuit (IC), other control logic, other electronic circuits, or combinations thereof that include a number of electronic components for performing the functionality of instructions 832-836. Accordingly, processor 820 may be implemented across multiple processing units and instructions 832-836 may be implemented by different processing units in different areas of computer 810.

Machine-readable storage medium 830 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 830 can be computer-readable and non-transitory. Machine-readable storage medium 830 may be encoded with a series of executable instructions for managing processing elements.

The instructions 832-836 when executed by processor 820 (e.g., via one processing element or multiple processing elements of the processor) can cause processor 820 to perform processes, for example, methods 100 and 200, and/or variations and portions thereof.

For example, receiving instructions 832 may cause processor 820 to receive multiple measurements of a plurality of metrics relating to execution of a workload over a database. The workload may be a query or a workflow. Aggregating instructions 834 may cause processor 820 to aggregate the multiple measurements of the plurality of metrics at multiple levels of execution of the workload. For a query, the multiple levels of execution can include a query level, a query phase level, a node level, a path level, and an operator level. For a workflow, the multiple levels of execution can include a workflow level, a node level, a logical operator level, and a physical operator level. Generating instructions 836 may cause processor 820 to generate a visualization representing execution of the workload, the visualization comprising a representation of the measurements of at least one of the metrics at one of the levels.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method performed by a processing system comprising:
receiving multiple measurements of a plurality of metrics relating to physical operators, in a physical execution tree, executing a database query;
determining logical operators in a query execution plan for executing the database query, wherein the query execution plan is determined from the physical execution tree, and each logical operator is associated with at least one of the physical operators;
aggregating the multiple measurements of the plurality of metrics at multiple levels associated with the logical operators;
generating a visualization representing execution of the database query, the visualization comprising a representation of the measurements of at least one of the metrics at one of the levels; and
updating the visualization periodically to include current measurements, wherein the updating of the visualization includes:
suppressing unhelpful information by one of hiding a non-executing portion of the database query, hiding an insignificant metric value of the database query, or using a logarithmic scale for a displayed chart;
receiving a first instruction to drill down on the visualization from a node level to a path level, wherein the first instruction includes a transition from displaying a first metric of a first logical operator at the node level to displaying the first metric of the first logical operator at the path level; and
pivoting, upon receiving a second instruction, to display the visualization along a different dimension, wherein the pivoting includes displaying the first metric for all of the logical operators at the path level.

2. The method of claim 1, further comprising:
providing a user interface to allow selection of one or more of the plurality of metrics at one of the multiple levels;
receiving a selection of one or more of the plurality of metrics at one of the multiple levels; and
generating a new visualization representing execution of the database query, the new visualization comprising a representation of the measurements of the selected one or more metrics at the one of the multiple levels.

3. The method of claim 2, wherein the user interface allows selection of a time period, the generated new visualization comprising a representation of the measurements of the selected one or more metrics at the one of the multiple levels over the selected time period.

4. The method of claim 1,
wherein the multiple levels comprise at least two levels from a query level, a query phase level, the node level, the path level, and an operator level.

5. The method of claim 4, wherein:
the visualization generated at the query level comprises a representation of execution of the entire database query,
the visualization generated at the query phase level comprises a representation of execution of the database query at a current phase of the database query,
the visualization generated at the node level comprises a representation of execution of the database query on one or more nodes of a query engine executing the database query,
the visualization generated at the path level comprises a representation of execution of logical operations of the database query, and
the visualization generated at the operator level comprises a representation of execution of physical operations of the database query.

6. The method of claim 5, further comprising modifying the visualization to show measurements of at least one of the plurality of metrics at a different level than the one of the levels in response to a user input.

7. The method of claim 1, wherein the plurality of metrics comprise at least two metrics from elapsed time, execution time, memory allocated, memory reserved, rows processed, processor utilization, and network activity.

8. The method of claim 1, wherein the visualization further comprises a representation of estimates of at least one of the plurality of metrics at the one of the levels.

9. A system comprising:
a database to store measurements of metrics relating to physical operators, in a physical execution tree, executing a database query, wherein the metrics are collected by a query execution engine during execution of the database query;
an aggregator, executed by a processor, to aggregate the measurements of the metrics at multiple levels of execution of the database query, wherein the multiple levels are associated with logical operators, and each logical operator corresponds to at least one of the physical operators;
a web server to provide a user interface to allow selection of one or more of the metrics and one of the levels; and
a visualization generator, executed by a processor, to generate a visualization representing execution of the database query, the visualization comprising a representation of the measurements of a selected metric at a selected level of execution,
wherein the user interface is further to allow updating of the visualization periodically to include current measurements, and further wherein to allow the updating of the visualization the user interface is to:
receive a first instruction to drill down on the visualization from a node level to a path level, wherein the first instruction includes a transition from displaying a first metric of a first logical operator at the node level to displaying the first metric of the first logical operator at the path level; and
pivot, upon receiving a second instruction, to display the visualization along a different dimension, wherein the pivoting includes displaying the first metric for all of the logical operators at the path level.

10. The system of claim 9, wherein the multiple levels comprise at least two levels from a query level, a query phase level, the node level, the path level, and an operator level.

11. A non-transitory computer-readable storage medium storing instructions for execution by a computer, the instructions when executed causing the computer to:

receive multiple measurements of a plurality of metrics relating to physical operators, in a physical execution tree, executing a database workload;

determine logical operators in an execution plan for executing the database workload, wherein the execution plan is determined from the physical execution tree, and each logical operator is associated with at least one of the physical operators;

aggregate the multiple measurements of the plurality of metrics at multiple levels associated with the logical operators;

generate a visualization representing execution of the workload, the visualization comprising a representation of the multiple measurements of at least one of the metrics at one of the levels; and update the visualization periodically to include current measurements, wherein to update the visualization, the instructions when executed cause the computer further to:

suppress unhelpful information by one of hiding a non-executing portion of a database query, hiding an insignificant metric value of the database query, or using a logarithmic scale for a displayed chart;

receive a first instruction to drill down on the visualization from a node level to a path level, wherein the first instruction includes a transition from displaying a first metric of a first logical operator at the node level to displaying the first metric of the first logical operator at the path level; and pivot, upon receiving a second instruction, to display the visualization along a different dimension, wherein the pivoting includes displaying the first metric for all of the logical operators at the path level.

12. The medium of claim 11, wherein the workload comprises a query or a workflow.

13. The medium of claim 12, wherein if the workload comprises a query, the multiple levels comprise at least two levels from a query level, a query phase level, the node level, the path level, and an operator level.

14. The medium of claim 12, wherein if the workload comprises a workflow, the multiple levels comprise at least two levels from a workflow level, the node level, a logical operator level, and a physical operator level.

* * * * *